United States Patent [19]

St. Jean

[11] 4,202,651
[45] May 13, 1980

[54] LATHE TOOL HOLDER

[76] Inventor: William A. St. Jean, 20881 Avon La., Southfield, Mich. 48075

[21] Appl. No.: 955,657

[22] Filed: Oct. 30, 1978

[51] Int. Cl.² .................................................. B26D 1/00
[52] U.S. Cl. ...................................... 407/91; 407/101; 407/110; 407/117; 82/36 R
[58] Field of Search ................. 407/91, 109, 110, 101, 407/117; 82/36 R

[56] References Cited

U.S. PATENT DOCUMENTS

| | | | |
|---|---|---|---|
| 1,415,379 | 5/1922 | Martin | 407/91 |
| 2,385,010 | 9/1945 | Lipani | 407/91 |
| 2,556,723 | 6/1951 | Hoffart | 407/91 |
| 2,848,788 | 8/1958 | Goglanian | 407/91 |

Primary Examiner—Leonidas Vlachos
Attorney, Agent, or Firm—Harness, Dickey & Pierce

[57] ABSTRACT

A lathe tool holder has a straight supporting arm and a clamping outer end formed by slotting the outer end in a horizontal central plane to define clamping jaws having opposed dovetail portions which when urged together by a clamping screw grip a resilient tool bit adapter having sides compressible by the jaws to grip a tool bit. Different tool bit adapters are used having socket-like bit-receiving openings which are either parallel to the plane of the slot in the holder or inclined with respect thereto, depending upon the type of work or direction of cut. A drilled hole extends vertically entirely through both jaws, and is tapped to form threads therein which lie on a nominally continuous helix, to receive the clamping screw. The clamping screw is threaded at its end remote from the head for a length which does not exceed the thickness of a single jaw. The threaded end of the screw is joined to the head by a shank which is slightly longer than the thickness of a single jaw and of a diameter less than the minimum diameter of the threads in the jaws.

4 Claims, 9 Drawing Figures

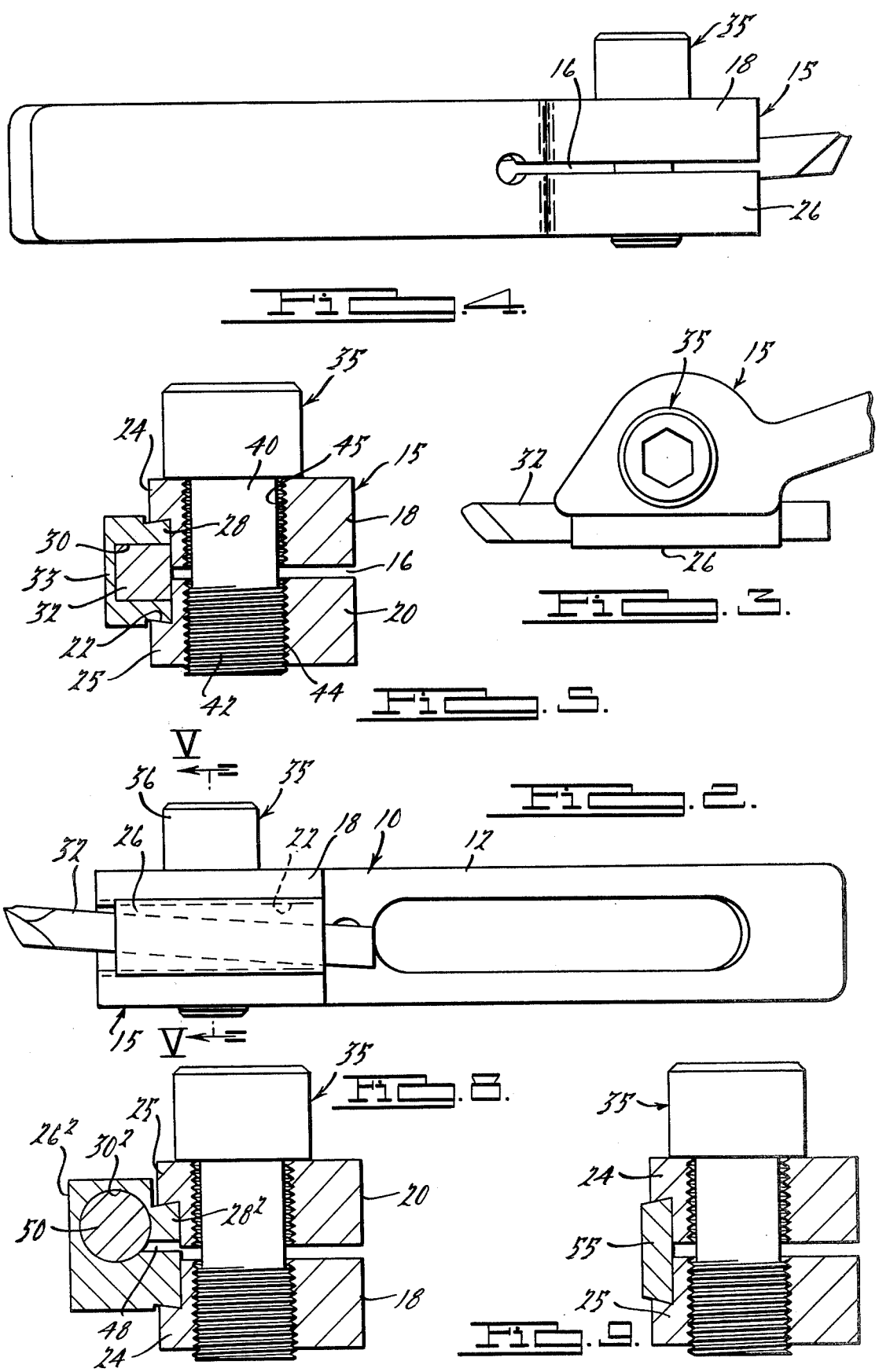

LATHE TOOL HOLDER

BACKGROUND OF THE INVENTION

Tool holders intended for cutting toward the right or left in engine lathes or the like are commonly provided with bit sockets inclined both upwardly and toward the left or right as the case may be, separate tools being required for right hand and left hand cutting or facing operations. Separate holders are also normally required for straight cuts, cutoff blades and boring bars. The overall objective of the present invention is to provide an improved holder which is adapted not only for both right hand and left hand cutting and facing, but also for straight cuts, cutoff work and boring, eliminating the need for separate holders for these several operations.

Other objects and advantages of this invention will become apparent to those skilled in the art upon consideration of the present disclosure in its entirety.

BRIEF DESCRIPTION OF THE FIGURES OF DRAWING

FIG. 2 is a side elevational view of the tool holder from the cutter side showing the bit installed for such facing operation;

FIG. 3 is a top plan view of the same partly broken away;

FIG. 4 is a rear elevational view of the same;

FIG. 5 is a cross section taken on the line V—V of FIG. 2;

FIG. 8 is a view corresponding to a cross section taken on the line VIII—VIII of FIG. 6 and looking in the direction of the arrows but showing a boring bar installed in the holder, and FIG. 9 is a view similar to FIG. 5 but showing a cut-off blade installed in the tool holder.

DETAILED DESCRIPTION OF PREFERRED FORM OF THE INVENTION

Figure 1:
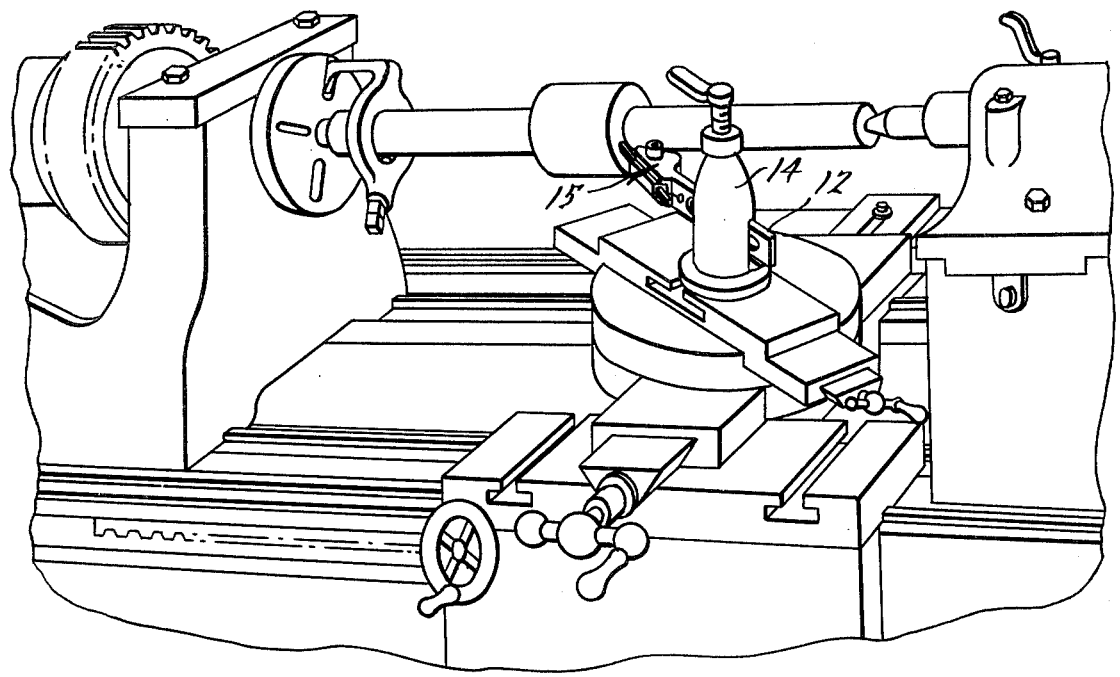
FIG. 1 is a perspective view of a portion of a metal working lathe showing work therein and a tool holder incorporating the present invention arranged for a right hand facing operation.

Referring now to the drawing, the body portion of my improved tool holder, formed of a rigid casting or forging, and which is generally designated 10, has a conventionally-shaped straight supporting arm portion 12 by which it is adapted to be mounted in a tool post as 14, FIG. 1, in the usual manner. The head 15 of the holder body is horizontally slotted for the full length of the head as indicated at 16 to impart resiliency to and define vertically spaced jaw portions 18, 20 of like cross section, as best shown in FIG. 5.

Along one side face of the head defined by the two jaw portions a dovetail-shaped recessed retaining slideway 22 is milled or otherwise suitably formed. Both the slot 16 and the longitudinal direction of the retaining slideway 22 are parallel to the longitudinal plane of the supporting arm 12, that is, they extend horizontally when the holder body is mounted horizontally in a tool post. The laterally projecting portions 24, 25 of the jaws 18, 20 which lie beside the recessed retaining slideway 22 define the clamping and holding arms of the jaw portions 18, 20.

A cutter holding adapter generally designated 26 has a male dovetailed portion 28 adapted to fit slidably into and when the jaws are tightened to be rigidly retained in the dovetailed retaining way 22. An open-faced tool socket is defined by a groove 30 formed in the face of the adapter body which abuts the head 15 when the adapter is installed, and is shaped to accurately receive the cutter or other tool bit for which the adapter is designed. In FIGS. 1-5 inclusive the adapter 26 has a socket 30 proportioned to receive a turning bit 32 of square cross section.

In FIGS. 1-5 inclusive the tool socket slot 30 is inclined upwardly toward the outer end of the head 15 when the tool holder is installed in the lathe in such manner that the cutter slants towards the left as indicated in FIG. 1, as is frequently required.

The jaw portions 18 and 20 are adapted to be drawn together, to clamp the adapter 26 and tool bit between them, by means of a clamping screw generally designated 35. It will be noted that the depth of the bit socket slot 30 in the adapter is great enough so that the wall 33 between the bottom of the socket and the outer face of the adapter is also somewhat flexible. The upper and lower sides of the adapter can thus be deflected toward one another by jaws 18, 20 to clamp the bit 32 when the screw 35 is tightened. Adapters having socket slots 30 of different dimensions are provided for bits of different sizes. For example, ¼" square sectioned bits and 3/16" square sectioned bits, and other sizes can be accommodated in adapters designed to fit the same holder, but the thickness of the adapter is varied to provide a wall 33 which is relatively thin, so that it can be flexed to grip the bit in response to tightening the screw 35.

Prior to forming the slot 16 the head is drilled and tapped perpendicularly and after slotting the tap is again run through the jaws while they are in their relaxed positioning. The threads in the two jaws thus lie accurately on the same nominal helix.

Figure 6:
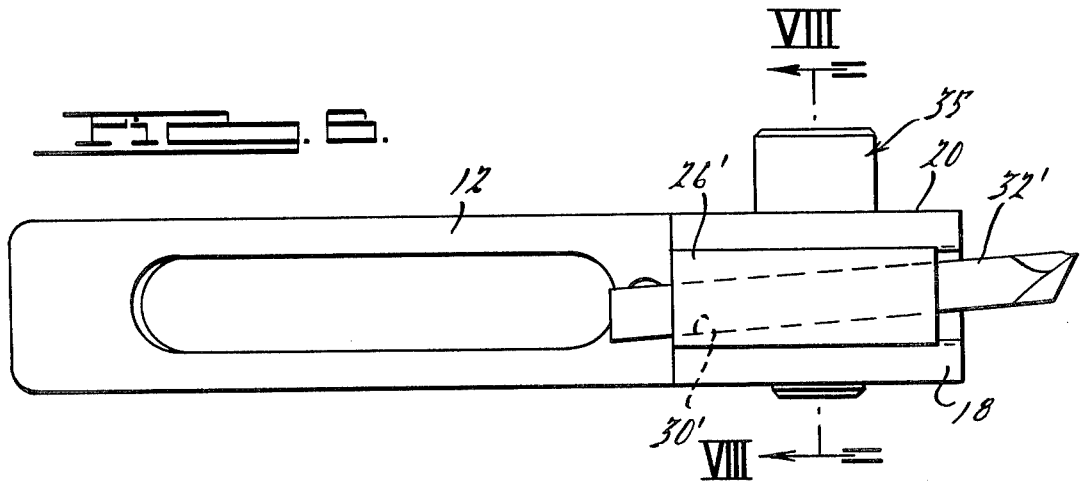
FIG. 6 is a side elevational view similar to FIG. 2 but showing a cutter installed for facing a left hand surface.

The head 36 of the clamping screw is provided with a wrench receiving portion shown as a socket 38 adapted to receive an Allen wrench. The screw has a shank portion 40 having an outside diameter slightly less than the minimum diameter of the internal threads in jaw portions 18, 20 and of a length slightly greater than the thickness of a single jaw. Beyond the reduced shank the screw has an externally threaded portion 42 threadably engageable with the internal threads 44 in jaw portion 20 when the screw is installed through the jaw portion 18, as shown in FIGS. 1-5. Screw end portion 42 is similarly engageable with the internal threads 45 in jaw portion 18 when the screw is installed through jaw portion 20, by screwing its threaded portion 42 entirely through and beyond jaw 20 and into jaw 18, as shown in FIG. 6.

Figure 7:
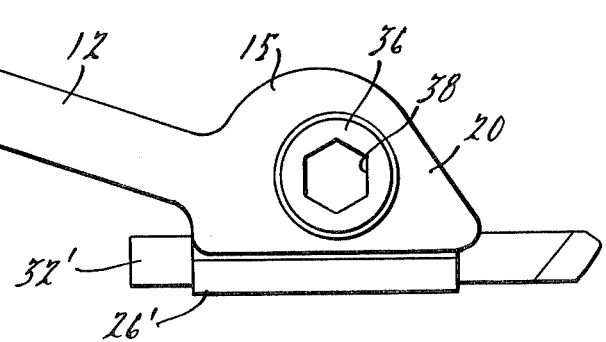
FIG. 7 is a top plan view of the same, partly broken away.

In order to utilize the tool to work from the left rather than from the right as shown in FIGS. 1-5, it is merely necessary to provide an adapter as 26' having its tool socket portion 30' inclined oppositely to the tool socket 30 of the right hand adapter shown in FIGS. 1-5. A bit suitable for the left end operation is thus installable by removing the clamping screw and the bit and adapter (if they are in place as shown in FIGS. 1-5) inverting the body, so that jaw portion 20 is uppermost, and reinstalling the clamping screw 35 and corresponding parts in similar fashion, as shown in FIGS. 6 and 7. In FIGS. 6 and 7, parts similar to those already described but modified for the left end operation are designated by like reference numerals primed, and will require no further detailed description.

FIG. 8 shows the tool holder body with a further modified type of adapter $26^2$ installed therein. In FIG. 8 parts corresponding to but somewhat modified from those already described are designated by like reference characters squared, and many will be seen to require no detailed redescription. The adapter has a cylindrical socket $30^2$ extending longitudinally therethrough and spaced from but parallel to all of the longitudinal faces of the adapter. A slot 48 extends through the side wall which carries the male dovetailed portion $28^2$. Portions $28^2$ when clamped in the head of the holder body, act to compress the adapter to a smaller internal diameter and clamp the boring bar 50 therein in response to tightening of the clamping screw 35.

Typically the boring bar is of course utilized with its axis parallel to the axis of the work. By installing the boring bar adapter in the holder with the jaw portion 20 uppermost, the angularity of the slideway 22 in the head 15 with relation to the supporting arm 12 makes it unnecessary to move the cross slide as far away from the operator as if the opposite positioning of the holder were used. As brought out in FIG. 8 the male dovetailed portions of the adapter $26^2$ are offset vertically with respect to the socket $30^2$. The adapter can be inverted by turning it end-to-end, and by virtue of this offset the vertical positioning of the boring bar can be changed to compensate for differences in the height of the tool post and the axial location of the workpiece.

In FIG. 9, a cutoff blade 55 is shown directly mounted in the clamping portions 24, 25 of the jaws 18,20. It will be appreciated that this permits the use of the same holder body for conventional cutoff operations.

My improved holder assembly thus eliminates the necessity for the use of the four special types of holders normally required for right and left hand turning, boring, facing and cutoff operations, yet performs with efficiency fully equal to the performance of all four of such special holders.

While preferred embodiments of the invention have been described herein, it will be appreciated that various modifications and changes may be made without departing from the spirit and scope of the appended claims.

This description of the preferred embodiments, and the accompanying drawings, have been furnished in compliance with the statutory requirement to set forth the best mode contemplated by the inventor of carrying out the invention. The prior portions consisting of the "Abstract of the Disclosure" and the "Background of the Invention" are furnished without prejudice to comply with administrative requirements of the Patent Office.

What is claimed is:

1. A tool holder for lathes and the like comprising a body having a supporting arm adapted to be mounted in a tool post or the like and having an outer end bifurcated to define a pair of coacting resilient clamping arms movable toward each other by a compressive force exerted perpendicular to the plane of bifurcation, each of said clamping arms having an orifice extending entirely therethrough in a direction perpendicular to said plane, said orifices being coaxial, the clamping arms being of like thickness in a direction parallel to the axis of said orifices, characterized in that
   A. both of said orifices have internal threads of like form and diameter
   B. the threads in the two clamping arms lie on the same nominal helix
   C. a clamping screw for said clamping arms is provided with a wrenchable head, a shank, and a screw portion at the end of the shank remote from the head and adapted to threadably engage the threads in said clamping arms
      a. the shank joining the screw portion to the head and being of a diameter less than the minimum diameter of said internal threads in the clamping arms
      b. the shank being of a length which slightly exceeds the thickness of one of said clamping arms.

2. A tool holder as defined in claim 1 including a clamping jaw portion on one side of each of said clamping arms, said jaw portions being movable toward and from each other in response to tightening and loosening of the clamping screw whereby an adapter for holding a tool bit, cutter or the like is adapted to be releasably held by the jaw portions.

3. A tool holder as defined in claim 1 wherein the length of the screw portion does not materially exceed the thickness of one of said clamping arms.

4. In combination with means as defined in claim 2, an adapter of generally U-shaped cross section, the legs defined by the sides of the U being resiliently movable toward and from one another by flexure of the bight portion, said legs being adapted to be retained between said jaw portions with the bight of the U spaced from the jaw portions, whereby the legs are movable to clamp or release a tool bit when the clamping arms are flexed in response to adjustment of the clamping screw.

* * * * *